United States Patent
Pinarbasi

(10) Patent No.: US 7,483,246 B2
(45) Date of Patent: Jan. 27, 2009

(54) MAGNETIC SENSOR HAVING A SEEDLAYER FOR PROVIDING IMPROVED HARD MAGNET PROPERTIES

(75) Inventor: Mustafa Michael Pinarbasi, Morgan Hill, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 566 days.

(21) Appl. No.: 10/954,807

(22) Filed: Sep. 29, 2004

(65) Prior Publication Data

US 2006/0067015 A1 Mar. 30, 2006

(51) Int. Cl.
*G11B 5/39* (2006.01)

(52) U.S. Cl. ............................. 360/324.12; 360/324.11

(58) Field of Classification Search ............. 360/324.1, 360/324.11, 324.12
See application file for complete search history.

(56) References Cited

U.S. PATENT DOCUMENTS

| | | | | |
|---|---|---|---|---|
| 5,801,984 | A * | 9/1998 | Parkin | 365/158 |
| 5,883,764 | A * | 3/1999 | Pinarbasi | 360/322 |
| 5,898,548 | A * | 4/1999 | Dill et al. | 360/324.2 |
| 5,959,810 | A * | 9/1999 | Kakihara et al. | 360/324.12 |
| 6,128,167 | A * | 10/2000 | Saito et al. | 360/324.12 |
| 6,185,081 | B1 * | 2/2001 | Simion et al. | 360/327.3 |
| 6,577,477 | B1 * | 6/2003 | Lin | 360/324.12 |
| 6,636,400 | B2 | 10/2003 | Pinarbasi et al. | 360/324.12 |
| 6,657,825 | B2 * | 12/2003 | Ho et al. | 360/321 |
| 6,876,525 | B2 * | 4/2005 | Lin et al. | 360/324.12 |
| 7,016,165 | B2 * | 3/2006 | Chien et al. | 360/324.12 |
| 7,020,951 | B2 * | 4/2006 | Lin et al. | 29/603.14 |
| 7,036,208 | B2 * | 5/2006 | Ho et al. | 29/603.13 |
| 7,038,892 | B2 * | 5/2006 | Chau et al. | 360/324.12 |
| 7,111,385 | B2 * | 9/2006 | Chau et al. | 29/603.14 |
| 7,112,375 | B2 * | 9/2006 | Marinero et al. | 360/327.3 |
| 2002/0015268 | A1 | 2/2002 | Mao et al. | 360/324.12 |
| 2002/0181171 | A1 | 12/2002 | Chien et al. | 360/324.12 |
| 2003/0008099 | A1 | 1/2003 | Nishikawa et al. | 428/65.3 |
| 2003/0058586 | A1 | 3/2003 | Pinarbasi et al. | 360/324.12 |
| 2004/0042130 | A1 | 3/2004 | Lin et al. | 360/324.12 |
| 2004/0072022 | A1 | 4/2004 | Kanbe et al. | 428/692 |
| 2004/0095691 | A1 | 5/2004 | Lin et al. | 360/324.1 |
| 2005/0066514 | A1 * | 3/2005 | Chau et al. | 360/324.12 |
| 2005/0068696 | A1 * | 3/2005 | Chau et al. | 360/324.12 |
| 2005/0164039 | A1 * | 7/2005 | Marinero et al. | 428/694 |

\* cited by examiner

*Primary Examiner*—Craig A Renner
(74) *Attorney, Agent, or Firm*—Zilka-Kotab, PC

(57) ABSTRACT

A magnetoresistive sensor having a novel seed layer that allows a bias layer formed there over to have exceptional hard magnetic properties when deposited over a crystalline structure such as an AFM layer of in a partial mill sensor design. The seed layer structure may be a CrMo/Si/CrMo sandwich or may also be a CrMo/Si/Cr sandwich and interrupts the epitaxial growth of an underlying crystalline structure, allowing a hard magnetic material formed over the seed layer to have a desired grain structure that is different from that of the underlying crystalline layer.

15 Claims, 4 Drawing Sheets

MAGNETIC SENSOR HAVING A SEEDLAYER FOR PROVIDING IMPROVED HARD MAGNET PROPERTIES

FIELD OF THE INVENTION

The present invention relates to free layer biasing in a magnetoresistive sensor, and more particularly to a seed layer for use with a bias layer formed over a crystalline structure.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk and when the disk rotates, air adjacent to the surface of the disk moves along with the disk. The slider flies on this moving air at a very low elevation (fly height) over the surface of the disk. This fly height is on the order of Angstroms. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head includes a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic impressions in tracks on the moving media, such as in circular tracks on the aforementioned rotating disk.

In recent read head designs a spin valve sensor, also referred to as a giant magnetoresistive (GMR) sensor, has been employed for sensing magnetic fields from the rotating magnetic disk. This sensor includes a nonmagnetic conductive layer, hereinafter referred to as a spacer layer, sandwiched between first and second ferromagnetic layers, hereinafter referred to as a pinned layer and a free layer. First and second leads are connected to the spin valve sensor for conducting a sense current therethrough. The magnetization of the pinned layer is pinned perpendicular to the air bearing surface (ABS) and the magnetic moment of the free layer is biased parallel to the ABS, but is free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to cos $\theta$, where $\theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

When a spin valve sensor employs a single pinned layer it is referred to as a simple spin valve. When a spin valve employs an antiparallel (AP) pinned layer it is referred to as an AP pinned spin valve. An AP spin valve includes first and second magnetic layers separated by a thin non-magnetic coupling layer such as Ru. The thickness of the spacer layer is chosen so as to antiparallel couple the magnetic moments of the ferromagnetic layers of the pinned layer. A spin valve is also known as a top or bottom spin valve depending upon whether the pinning layer is at the top (formed after the free layer) or at the bottom (before the free layer).

Magnetization of the pinned layer is usually fixed by exchange coupling one of the ferromagnetic layers (AP1) with a layer of antiferromagnetic material such as PtMn. While an antiferromagnetic (AFM) material such as PtMn does not in and of itself have a magnetic moment, when exchange coupled with a magnetic material, it can strongly pin the magnetization of the ferromagnetic layer.

The spin valve sensor is located between first and second nonmagnetic electrically insulating read gap layers and the first and second read gap layers are located between ferromagnetic first and second shield layers. In a merged magnetic head a single ferromagnetic layer functions as the second shield layer of the read head and as the first pole piece layer of the write head. In a piggyback head the second shield layer and the first pole piece layer are separate layers.

As those skilled in the art will appreciate, the distance between the shields (gap thickness) determines the bit length for the read sensor. With the ever increasing pressure to increase data capacity and data rate, engineers are constantly under pressure to decrease the bit length (and therefore gap thickness) of read sensors. One way to decrease this gap thickness is by a partial mill process. Sensors have traditionally been constructed by depositing sensor layers as full film layers onto the first gap layer. A photoresist mask is then formed over the area that is to be the sensor and a material removal process such as ion milling is performed to remove material from the areas not covered by the mask. This material removal process has traditionally been performed down into the first gap layer, removing a portion of the first gap material at either side of the sensor.

Since this material removal process removes a portion of the first gap layer, it has been necessary to deposit a thick first gap layer in order prevent electrical shorts through the gap to the first shield. Such a short would be a catastrophic event that would render the sensor unusable. In these prior art heads, hard bias layers, constructed of a hard magnetic material such as CoPtCr have then been deposited over this etched out portion of the first gap layer at either side of the sensor to provide magnetic biasing to bias the magnetic moment of the free layer in the desired direction parallel with the ABS.

As discussed above, the removal of a portion of the first gap during formation of the sensor requires a larger overall gap thickness to prevent shorting. One way to overcome this is to use a partial mill process in which the material removal process (ie. ion milling) used to construct the sensor is terminated before all of the sensor material has been removed, such as when the material removal process has reached a point around the AFM layer (usually PtMn) near the bottom of the sensor. By stopping the milling process within the sensor layers, such as at the AFM layer no gap material is removed. This allows a much thinner gap to be deposited. The bias layers are then deposited on top of the remaining sensor layer rather than on the gap layer.

A problem that arises from such partial milling is that the bias layer properties are different when deposited over the AFM layer or other sensor layer than they are when deposited over the gap layer. The gap layer, usually $Al_2O_3$ is amorphous. It therefore has no crystalline structure to impart to the seed layer or to the hard bias material when the material is deposited onto the gap. Therefore, a hard bias structure deposited over the amorphous gap layer can exhibit a desired epitaxial growth that provides desired high retentive moment and high coercivity needed for free layer biasing.

However, the AFM layer, such as for example PtMn, as well as other sensor layers are not amorphous and exhibit their own grain structures. When the hard bias layers are deposited over the AFM layer, the grain structure of the underlying AFM layer carries through to the seed layer and hard bias layers. This grain structure being undesirable for optimal hard bias properties results in degraded biasing properties. This leads to free layer instability and associated signal noise. For example, depositing a CoPtCr hard magnetic material with a Cr seed layer over a PtMn substrate results in a CoPtCr hard bias layer with a coercivity of only around 600 Oe. This is much lower than the roughly 1400 Oe coercivity obtained when the same hard bias layer and seed are deposited on a glass (amorphous) substrate.

Therefore there is a strong felt need for a hard bias structure that can be formed over an AFM material or other sensor material while still exhibiting the necessary hard magnetic properties needed for effective free layer biasing. Such a bias structure would preferably allow a hard bias layer such as one containing Co, Pt and Cr to be applied over an AFM layer such as PtMn without the hard bias layer taking on the undesirable grain structure of the underlying AFM layer.

SUMMARY OF THE INVENTION

The present invention provides a magnetoresistive sensor having improved free layer biasing. The sensor includes a layer having a crystalline structure. This layer can be for example an antiferromagnetic (AFM) material such as PtMn. A seed layer that includes CrMo is deposited over the crystalline layer. A layer of hard magnetic material is then formed over the seed layer. The hard magnetic material can be for example CoPtCr.

The novel seed layer structure of the present invention advantageously allows the hard magnetic layer deposited there over to exhibit excellent hard magnetic properties for stable and efficient free layer biasing. The seed layer interrupts the undesirable grain structure of the underlying crystalline layer and initiates a desired crystalline growth in the hard bias layer deposited above.

In addition, the novel seed layer does not contain Ta and therefore does not experience the oxidation problems exhibited by prior art seed layers. This allows the seed layer to remain in an un-oxidized state, providing better electrical conductivity at the junction of the sensor with the bias layer and leads.

The seed layer can be a single layer of Si sandwiched between two layers of CrMo or could also be a layer of Si sandwiched between a layer of Cr and a layer of CrMo.

These and other advantages and features of the present invention will be apparent upon reading the following detailed description in conjunction with the Figures.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

BEST MODE FOR CARRYING OUT THE INVENTION

The following description is of the best embodiments presently contemplated for carrying out this invention. This description is made for the purpose of illustrating the general principles of this invention and is not meant to limit the inventive concepts claimed herein.

Figure 1:
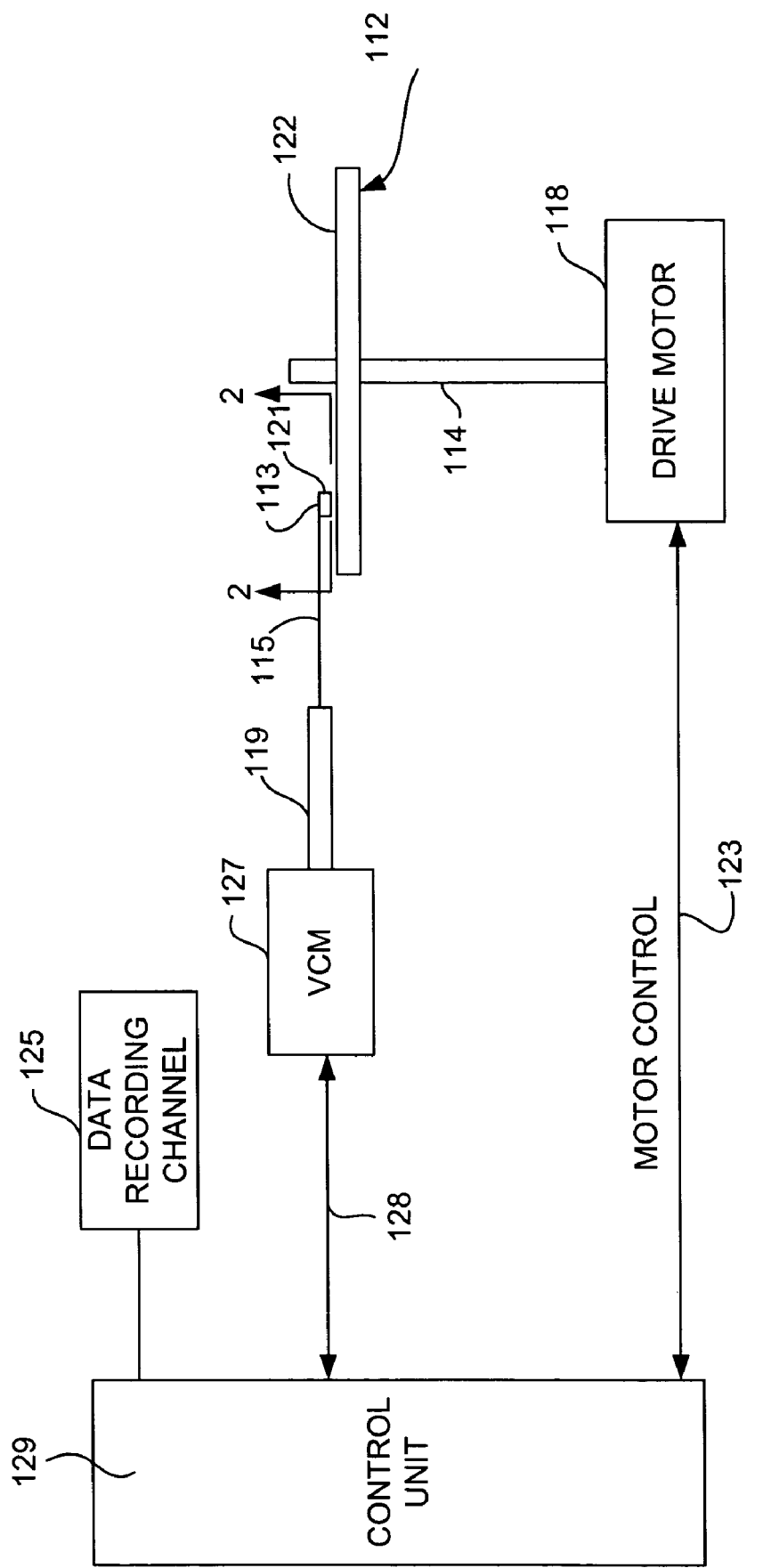
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
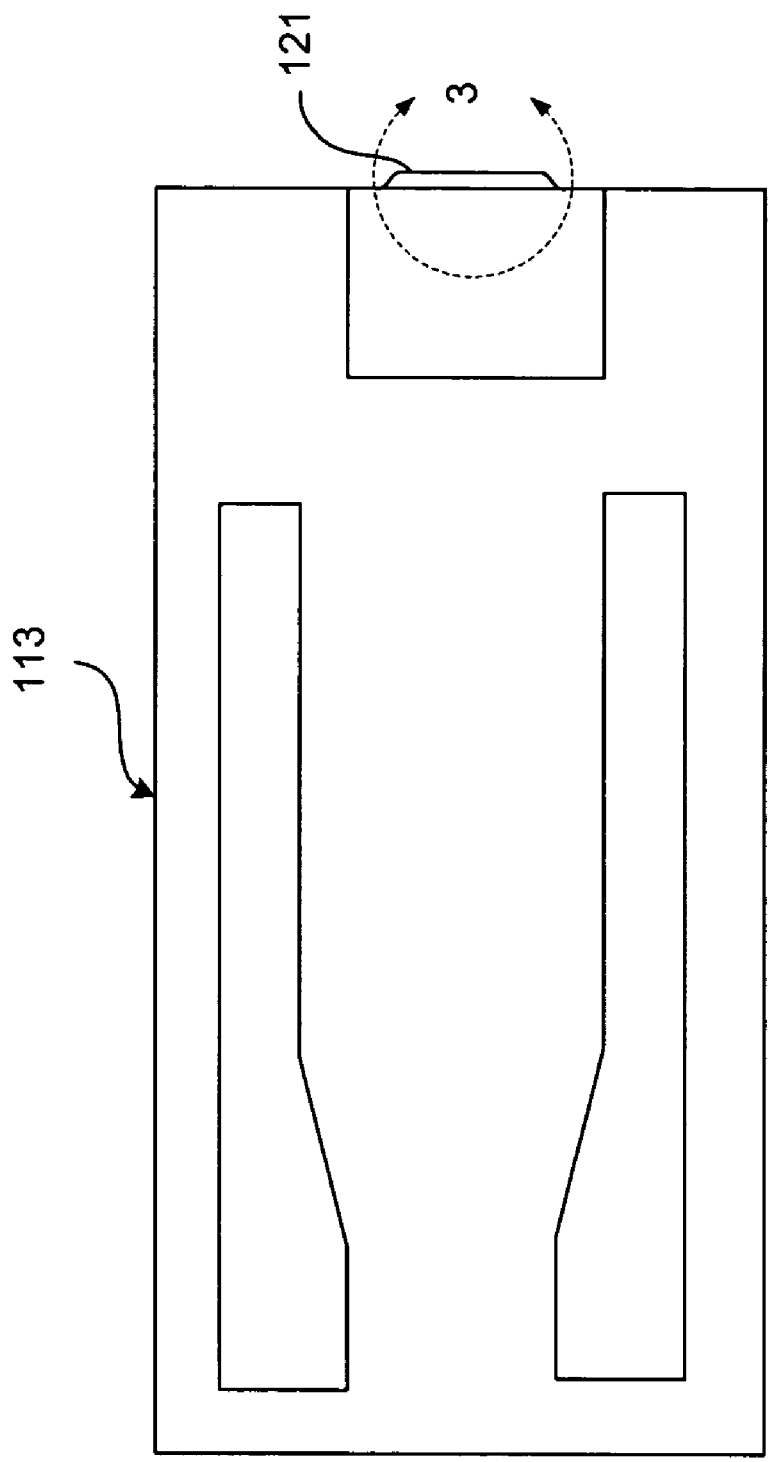
FIG. 2 is an ABS view of a slider, taken from line 2-2 of FIG. 1, illustrating the location of a magnetic head thereon.
Figure 3:
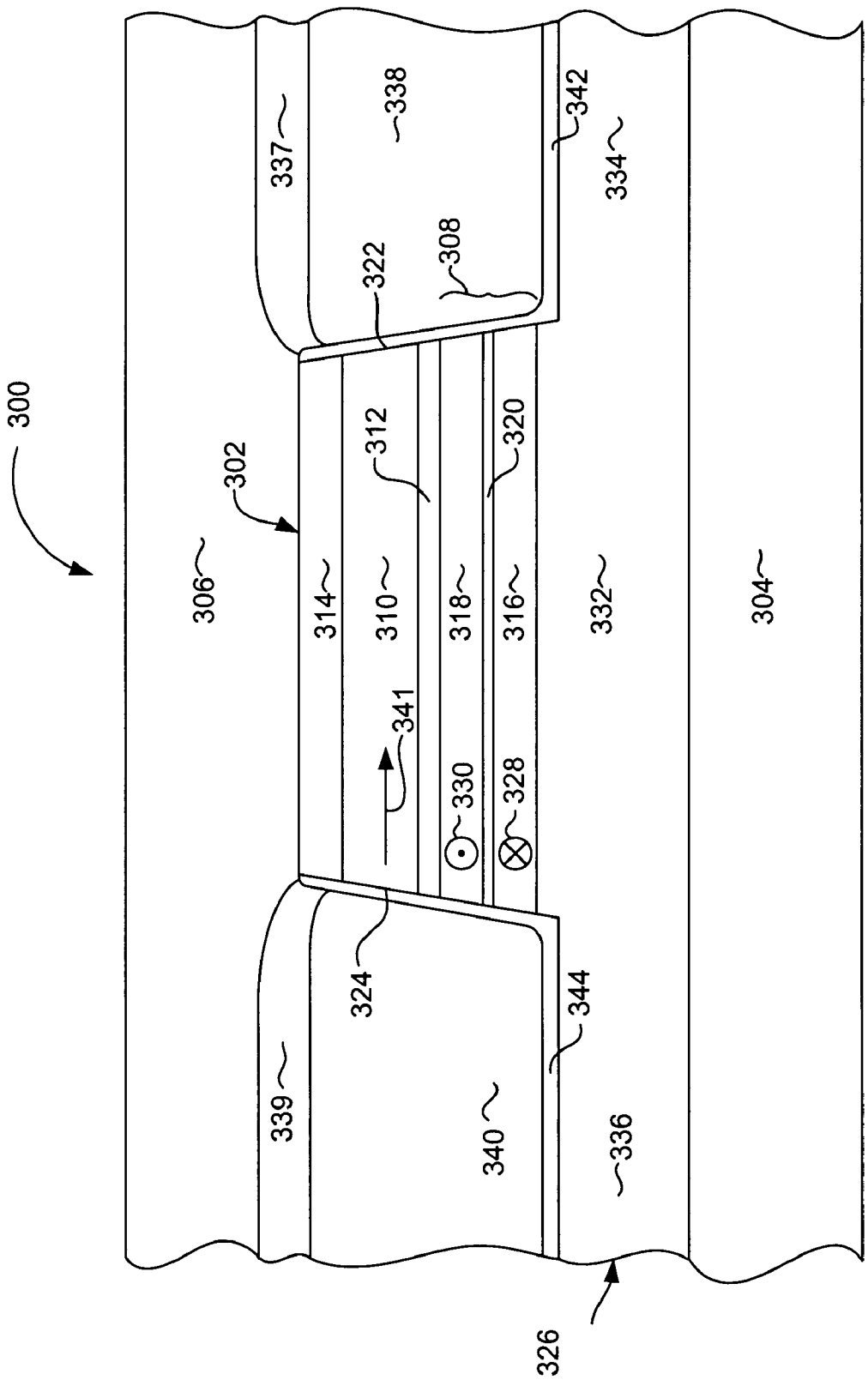
FIG. 3 is an ABS view of a magnetic sensor according to an embodiment of the present invention taken from circle 3 of FIG. 2.

With reference to FIG. 2, the orientation of the magnetic head 121 in a slider 113 can be seen in more detail. FIG. 3 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

With reference now to FIG. 3, a magnetoresistive sensor 300 according to an embodiment of the invention includes sensor stack 302 sandwiched between first and second gap layers 304, 306. The sensor stack 302 includes a magnetic pinned layer structure 308 and a magnetic free layer 310. A non-magnetic, electrically conductive spacer layer 312, such as Cu, is sandwiched between the free layer 310 and the pinned layer structure 308. A capping layer 314, such as Ta, may be provided at the top of the sensor stack 302 to protect the sensor from damage during manufacturing, such as from corrosion during subsequent annealing processes.

The pinned layer 308 can be a simple pinned structure or an antiparallel (AP) pinned structure and is preferably an AP pinned structure including first and second magnetic layers (AP1) 316, and (AP2) 318 which may be for example CoFe antiparallel coupled across a thin AP coupling layer 320 such as Ru. The free layer 310 can be constructed of various magnetic materials such as NiFe or CoFe, and may include a layers of CoFe and NiFe, preferably with a layer of CoFe or Co adjacent to the spacer 312 for optimal sensor performance.

As can be seen with reference to FIG. 3, the sensor stack 302 has first and second laterally opposed side walls 322, 324 that define the track-width or active area of the sensor. A layer of antiferromagnetic material (AFM) 326, preferably PtMn, formed at the bottom of the sensor stack 302 is exchange coupled with the AP1 layer 316. The AFM layer has an extremely high coercivity, and when exchange coupled with the AP1 layer 316 strongly pins the magnetic moment of the AP1 layer 316 as indicated by arrowhead 328. This in turn strongly pins the moment 330 of the AP2 layer 318 by antiparallel exchange coupling across the AP coupling layer 320. Also as can be seen, the AFM layer 326 has a portion 332 that is disposed within the track width or active area of the sensor 300, but also has first and second laterally extending portions 334, 336 that extend laterally outward beyond the active area of the sensor 300. The laterally extending portions 334, 336 may be slightly thinner than the inner portion 332 due to a partial milling process used to construct the sensor 300. It should be pointed out other sensor layers, such as the pinned layer 308 or spacer 312 could also extend beyond the active area of the sensor 300 as well. The extension of the AFM layer 326 alone is by way of example only.

With continued reference to FIG. 3, the sensor 300 includes first and second hard magnetic, bias layers (HB layers) 338, 340. In addition, first and second leads 337, 339 are formed over the HB layers 338, 340. The leads 337, 339 may be constructed of, for example, Ta, Au, Rh or some other electrically conducting material. The HB layers 338, 340 are preferably constructed of an alloy containing Co, Pt and Cr, more specifically $Co_{80}Pt_{12}Cr_8$. The hard bias layers 338, 340 have a high magnetic coercivity, and are magnetostatically coupled with the free layer 310 to bias the magnetic moment of the free layer 310 in a direction parallel with the ABS as indicated by arrow 341.

Seed layers 342, 344 are provided beneath the HB layers 338, 340. The seed layers 342, 344 preferably extend over the laterally extending portions 334, 336 of the AFM layer as well as over the side walls 322, 324 of the sensor stack 302.

Figure 4:
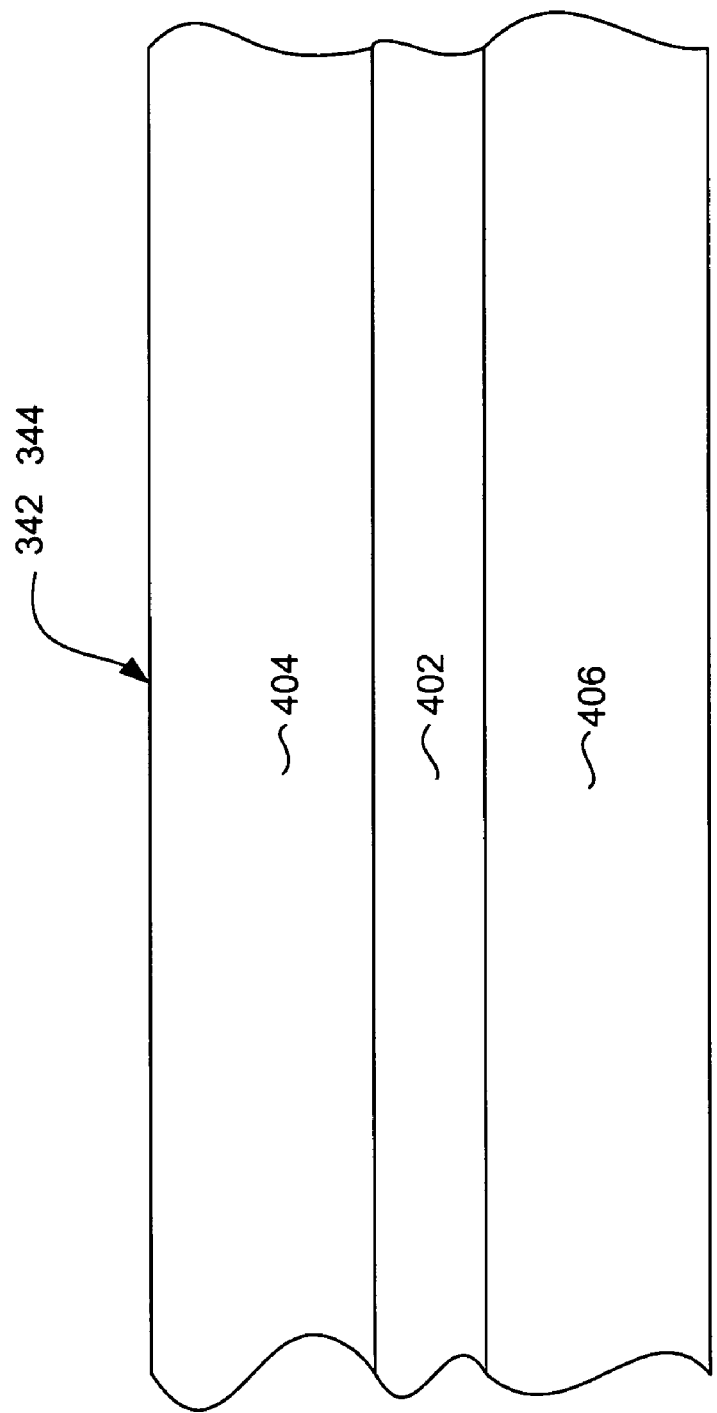
FIG. 4 is an expanded cross sectional view of a seed layer for use in the present invention.

With reference to FIG. 4, the seed layers 342, 344 are each constructed as a composite of layers. In one possible embodiment the seed layers 342, 344 each include a layer of Si 402 sandwiched between first and second layers of CrMo 404, 406. In another possible embodiment the seed layers 342, 344 can be constructed as a layer of Si 402 sandwiched between a layer of CrMo 404 and a layer of Cr 406, with the layer of CrMo 404 preferably being at the top (ie. closest to the hard bias layers 338, 340).

With continued reference to FIG. 4, the layer 406 closest to the AFM layer preferably has a thickness of 2 to 15 Angstroms, while the layer 404 closest to the hard bias layer 336, 340 preferably has a thickness of 40 to 60 Angstroms. The Si layer 402 preferably has a thickness of 5-15 Angstroms. These dimension apply whether the seed layers 342, 244 have the Cr/Si/CrMo construction or the CrMo/Si/CrMo construction.

The seed layers 342, 344 of the present invention provide an advantage with regard to oxidation, compared with prior art seed layers, which have included a layer of Ta. Ta is a highly reactive metal, and the prior art seed layers, such as Ta/Si/CrMo or Ta/Si/Cr have been found to oxidize. The above described seed layers, which do not include Ta do not have this corrosion problem.

The seed layers 338, 340 promote a desired epitaxial crystalline growth in the HB layers 338, 340 deposited thereon. This desired grain structure in the hard bias layers 338, 340 allows the hard bias layers to have a desired high magnetic moment and high coercivity that is necessary for strong free layer biasing.

The above described hard magnetic material (CoPtCr) has been demonstrated to have a very high coercivity and squareness when used in conjunction with the above described seed layers 342, 344 and deposited over the crystalline AFM material 332. Although various compositions of the hard bias layer 338, 340 are possible, excellent results have been achieved with $Co_{80}Pt_{12}Cr_6$.

While various embodiments have been described above, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A magnetoresistive sensor comprising:
   a plurality of sensor layers;
   a portion of the plurality of sensor layers terminating at first and second laterally opposed sides to define an active sensor area;
   a portion of the plurality of sensor layers extending beyond the active area of the sensor to form first and second laterally extending portions;
   a seed layer formed over the laterally extending portions of the sensor layers, the seed layer comprising a layer comprising CrMo, a layer comprising Cr and a layer comprising Si sandwiched between the layer comprising CrMo and the layer comprising Cr; and
   a hard magnetic material formed over the seed layer over each of the first and second laterally extending portions of the sensor layers.

2. A sensor as in claim 1 wherein the seed layer extends at least partially over at least one of the first and second laterally opposed sides that define the active sensor area.

3. A sensor as in claim 1, wherein:
the layer comprising Cr has a thickness of 2-15 Angstroms and is disposed adjacent to the laterally extending portions;
the layer comprising CrMo has a thickness of 40 to 60 Angstroms and is disposed adjacent to the hard magnetic material; and
the layer comprising Si has a thickness of 5 to 15 Angstroms.

4. A magnetoresistive sensor comprising:
a plurality of sensor layers;
a portion of the plurality of sensor layers terminating at first and second laterally opposed sides to define an active sensor area;
a portion of the plurality of sensor layers extending beyond the active area of the sensor to form first and second laterally extending portions;
a seed layer formed over the laterally extending portions of the sensor layers, the seed layer comprising a first layer comprising CrMo, a second layer comprising CrMo and a layer comprising Si sandwiched between the first and second layers comprising CrMo; and
a hard magnetic material formed over the seed layer over each of the first and second laterally extending portions of the sensor layers.

5. A sensor as in claim 4 wherein the seed layer extends at least partially over at least one of the first and second laterally opposed sides that define the active sensor area.

6. A sensor as in claim 4, wherein:
the first layer comprising CrMo has a thickness of 2-15 Angstroms and is disposed adjacent to the laterally extending portions;
the second layer comprising CrMo has a thickness of 40 to 60 Angstroms and is disposed adjacent to the hard magnetic material; and
the layer comprising Si has a thickness of 5 to 15 Angstroms.

7. A magnetoresistive sensor, comprising:
a sensor stack having first and second laterally opposed sides defining an active area;
a layer of antiferromagnetic material having first and second laterally extending portions that extend beyond the active area of the sensor, the laterally extending portions each having a surface;
a seed layer formed over the surface of each laterally extending portion of the layer of antiferromagnetic material, the seed layer comprising a layer comprising CrMo, a layer comprising Cr and a layer comprising Si sandwiched between the layer comprising CrMo and the layer comprising Cr; and
first and second hard magnetic layers formed on the seed layer over each of the first and second laterally extending portions of the layer of antiferromagnetic material.

8. A magnetoresistive sensor as in claim 7, wherein the seed layer comprises:
the layer comprising Cr has a thickness of between 2 and 15 Angstroms;
the layer comprising CrMo has a thickness of between 40 and 60 Angstroms; and
the layer comprising Si has a thickness of between 5 and 15 Angstroms.

9. A magnetoresistive sensor as in claim 8, wherein:
the layer comprising Cr is disposed adjacent to the layer of antiferromagnetic material; and
the layer comprising CrMo is disposed adjacent to the hard magnetic layers.

10. A magnetoresistive sensor as in claim 8, wherein the hard magnetic layers comprise CoPtCr.

11. A magnetoresistive sensor as in claim 10, wherein:
the layer comprising Cr is disposed adjacent to the layer of antiferomagnetic material; and
the layer comprising CrMo is disposed adjacent to the hard magnetic layers.

12. A magnetoresistive sensor, comprising:
a sensor stack having first and second laterally opposed sides defining an active area;
a layer of antiferromagnetic material having first and second laterally extending portions that extend beyond the active area of the sensor, the laterally extending portions each having a surface;
a seed layer formed over the surface of each laterally extending portion of the layer of antiferromagnetic material, the seed layer comprising a first layer comprising CrMo, a second layer comprising CrMo and a layer comprising Si sandwiched between the first and second layers comprising CrMo; and
first and second hard magnetic layers formed on the seed layer over each of the first and second laterally extending portions of the layer of antiferromagnetic material.

13. A magnetoresistive sensor as in claim 12 wherein the first layer of CrMo has a thickness of between 2 and 15 Angstroms.

14. A magnetoresistive sensor as in claim 12, wherein:
the first layer comprising CrMo has a thickness of between 2 and 15 Angstroms;
the second layer comprising CrMo has a thickness of between 40 and 60 Angstroms; and
the layer comprising Si has a thickness of between 5 and 15 Angstroms.

15. A magnetoresistive sensor as in claim 12 wherein the seed layer extends over the first and second laterally opposed sides of the sensor stack.

* * * * *